(12) United States Patent
Herberger et al.

(10) Patent No.: US 8,732,221 B2
(45) Date of Patent: May 20, 2014

(54) SYSTEM AND METHOD OF MULTIMEDIA CONTENT EDITING

(75) Inventors: Tilman Herberger, Dresden (DE); Titus Tost, Dresden (DE)

(73) Assignee: Magix Software GmbH (DE)

( * ) Notice: Subject to any disclaimer, the term of this patent is extended or adjusted under 35 U.S.C. 154(b) by 751 days.

(21) Appl. No.: 12/814,861

(22) Filed: Jun. 14, 2010

(65) Prior Publication Data

US 2010/0250510 A1    Sep. 30, 2010

Related U.S. Application Data

(63) Continuation-in-part of application No. 10/732,099, filed on Dec. 10, 2003, now abandoned.

(51) Int. Cl.
| | |
|---|---|
| *G06F 17/30* | (2006.01) |
| *G11B 3/38* | (2006.01) |
| *G11B 5/00* | (2006.01) |
| *G11B 27/28* | (2006.01) |

(52) U.S. Cl.
CPC ..................... *G06F 17/30* (2013.01)
USPC ........... 707/899; 715/719; 715/720; 715/721; 715/722; 715/723; 715/730; 715/731; 715/732; 715/777; 709/203; 709/217; 709/219; 709/229

(58) Field of Classification Search
USPC .......... 707/899; 715/719–723, 730–732, 777; 709/203, 217, 229, 219
See application file for complete search history.

(56) References Cited

U.S. PATENT DOCUMENTS

| | | |
|---|---|---|
| 5,404,316 A | 4/1995 | Klingler et al. |
| 5,467,288 A | 11/1995 | Fasciano et al. |
| 5,469,370 A | 11/1995 | Ostrover et al. |
| 5,682,326 A | 10/1997 | Klingler et al. |
| 5,754,179 A | 5/1998 | Hocker et al. |
| 5,760,767 A | 6/1998 | Shore et al. |
| 5,781,188 A | 7/1998 | Amiot et al. |
| 5,801,694 A | 9/1998 | Gershen |
| 5,861,880 A | 1/1999 | Shimizu et al. |
| 5,886,698 A | 3/1999 | Sciammarella et al. |
| 5,969,716 A | 10/1999 | Davis et al. |
| 5,999,173 A | 12/1999 | Ubillos |
| 6,134,243 A | 10/2000 | Jones et al. |
| 6,154,207 A | 11/2000 | Farris et al. |
| 6,204,840 B1 | 3/2001 | Petelycky et al. |

(Continued)

FOREIGN PATENT DOCUMENTS

EP    1 666967 A1    6/2006

*Primary Examiner* — Yicun Wu
(74) *Attorney, Agent, or Firm* — Fellers, Snider, Blankenship, Bailey & Tippens, P.C.; Terry L. Watt

(57) ABSTRACT

According to a preferred embodiment, there is provided a computer program for use in the creation and editing of multimedia works which provides a much simplified method of selecting and placing multimedia clips, with a length of less than about 20 seconds, into a longer composition. In one preferred embodiment, the user is provided with a graphical user interface where he or she can add to or modify the multimedia content contained therein by simply clicking the mouse above an empty track location, with the replacement clips being chosen and inserted into the work automatically. In another embodiment, the user will specify the screening criteria for a plurality of tracks, which tracks will then be automatically populated with clips according to the user's rules to generate a multimedia work.

14 Claims, 6 Drawing Sheets

(56) References Cited

U.S. PATENT DOCUMENTS

| | | | |
|---|---|---|---|
| 6,222,537 B1 | 4/2001 | Smith et al. | |
| 6,243,087 B1 | 6/2001 | Davis et al. | |
| 6,388,181 B2 | 5/2002 | Moe | |
| 6,400,378 B1 | 6/2002 | Snook | |
| 6,426,778 B1 | 7/2002 | Valdez, Jr. | |
| 6,544,293 B1 | 4/2003 | Ohanian | |
| 6,573,909 B1 | 6/2003 | Nagao | |
| 6,662,231 B1* | 12/2003 | Drosset et al. | 709/229 |
| 6,775,659 B2 | 8/2004 | Clifton-Bligh | |
| 6,925,608 B1 | 8/2005 | Neale et al. | |
| 6,928,433 B2 | 8/2005 | Goodman et al. | |
| 7,124,366 B2* | 10/2006 | Foreman et al. | 715/719 |
| 7,295,977 B2 | 11/2007 | Whitman et al. | |
| 7,434,170 B2 | 10/2008 | Novak et al. | |
| 7,454,329 B2 | 11/2008 | Abe et al. | |
| 7,582,823 B2 | 9/2009 | Kim et al. | |
| 7,623,755 B2* | 11/2009 | Kuspa | 386/282 |
| 2003/0002851 A1 | 1/2003 | Hsiao et al. | |
| 2003/0030661 A1 | 2/2003 | Miyauchi et al. | |
| 2005/0010589 A1 | 1/2005 | Novak et al. | |
| 2005/0022132 A1 | 1/2005 | Herzberg et al. | |
| 2006/0016322 A1 | 1/2006 | Randle et al. | |
| 2006/0048076 A1 | 3/2006 | Vronay et al. | |
| 2006/0112808 A1 | 6/2006 | Kiiskinen et al. | |
| 2006/0181537 A1 | 8/2006 | Vasan et al. | |
| 2007/0107584 A1 | 5/2007 | Kim et al. | |
| 2007/0176922 A1 | 8/2007 | Ikeda et al. | |
| 2007/0245257 A1 | 10/2007 | Chan et al. | |
| 2008/0301128 A1 | 12/2008 | Gandert et al. | |
| 2008/0314228 A1 | 12/2008 | Dreyfuss et al. | |
| 2009/0013004 A1 | 1/2009 | Manukyan et al. | |
| 2009/0132077 A1 | 5/2009 | Fujihara et al. | |
| 2009/0132591 A1 | 5/2009 | Toms et al. | |
| 2009/0193351 A1 | 7/2009 | Lee et al. | |
| 2009/0228481 A1 | 9/2009 | Neale et al. | |

* cited by examiner

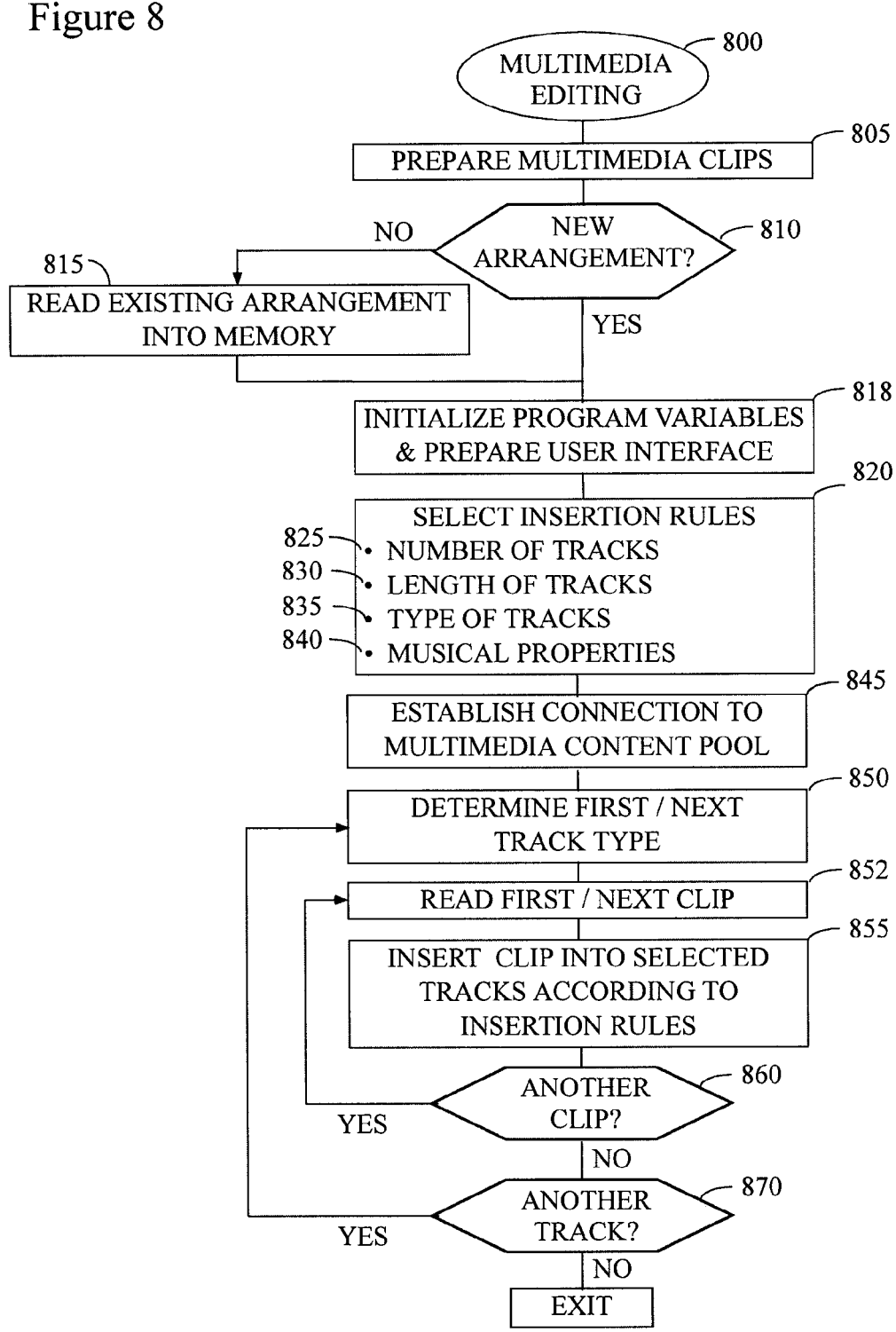

SYSTEM AND METHOD OF MULTIMEDIA CONTENT EDITING

This application is a continuation-in-part of co-pending U.S. patent application Ser. No. 10/732,099, filed Dec. 10, 2003 and incorporates said application by reference into this document as if fully set out at this point.

FIELD OF THE INVENTION

The present invention relates generally to the editing and organizing of multimedia material for subsequent replay. More particularly, but not by way of limitation, the present invention relates to methods of assisting a novice user to quickly compose or modify the content of a multimedia work.

BACKGROUND OF THE INVENTION

In recent years the graphical user interface of most media content editing software has tended to converge toward a somewhat standardized screen layout. In such layouts, one part of the screen typically contains a graphical representation of the current state of the composed multimedia work, and another contains graphical controls which manage the playback of the multimedia content. Additionally, a substantial portion of the screen is usually occupied by a selection window which contains multimedia content which is selectable by the user, e.g., audio clips, video clips, etc. The selection window also typically allows the user to browse the available storage devices in the user's computer or accessible via a network for additional multimedia content.

Of course, those of ordinary skill in the art will recognize that the process of locating and selecting specific multimedia content for inclusion in a work can prove to be quite tedious, especially for an unskilled or novice user who potentially is dealing with media from many different sources (e.g., images from digital still and video cameras, audio recordings, stock sound and video libraries, etc.).

Of course, the wide spread availability and growing popularity of digital multimedia devices has forced unprecedented numbers of novice users to cope with the intricacies of the digital revolution. For a novice the process of media editing can be a daunting and time consuming process that may require the mastery of a completely new vocabulary and the learning of the specific operations and features of specialized media editing software.

By way of example, consider the situation that confronts the novice computer user who is faced with a typical graphical user interface of the sort described previously. The screen is divided up into different regions, some of which are containing lists of audio or video input files, others which are for receipt of the selected input media files, still others are used in connection with the editing and the application of effects, etc. Of course, these screen windows are typically inadequately labelled so that the user may be completely mystified when an attempt to place a video clip into an audio track results in the generation of an error. Similarly, the user is given little guidance in the use of the various transport, editing, and other controls that are scattered about the screen. Thus, and at a minimum, the novice user must become accustomed to the structure of the graphical user interface, he or she has to learn to recognize the differences between the various sorts of multimedia clips that might be used as input, and he or she must master the standard selection process for multimedia content, which is conventionally a "drag and drop" type interaction. All this, can be very frustrating and time consuming for a novice user and can delay significantly the production of any meaningful results.

Thus what is needed is a method to enable the user to quickly and efficiently create multimedia compositions out of multimedia content without spending inordinate amounts of time learning to understand the technology involved. It would additionally be preferred that the invention enables a user to edit existing multimedia works in the same efficient manner.

Heretofore, as is well known in the multimedia industry, there has been a need for an invention to address and solve the above-described problems. Accordingly it should now be recognized, as was recognized by the present inventors, that there exists, and has existed for some time, a very real need for a system and method that would address and solve the above-described problems.

Before proceeding to a description of the present invention, however, it should be noted and remembered that the description of the invention which follows, together with the accompanying drawings, should not be construed as limiting the invention to the examples (or preferred embodiments) shown and described. This is so because those skilled in the art to which the invention pertains will be able to devise other forms of this invention with the ambit of the appended claims.

SUMMARY OF THE INVENTION

According to a preferred embodiment, there is provided a computer program for use in the creation and editing of multimedia works which provides a much simplified method of selecting and placing multimedia clips into a multimedia work. In one preferred embodiment, the user is provided with a graphical user interface which might appear to be similar to that of a traditional multimedia editing program, but wherein the user is provided with a method of rapidly populating and/or replacing elements in an audio or video track, thereby producing a new multimedia work.

In one preferred embodiment, each of the displayed tracks will be predefined to accept a single type of multimedia content, e.g., a video track will only accept video clips, an audio track might be limited to accepting only clips which contain, for example, a particular instrument (e.g., a flute, trumpet, guitar, etc.), etc. In this embodiment the user will insert new multimedia content, both audio and video clips being generally referred to hereinafter as multimedia clips, by simply moving the on-screen cursor over one of the on-screen tracks. When the controlling computer program senses that the cursor is hovering over an empty track location, it will insert an appropriate multimedia clip from among those available in a multimedia clip pool into the target location. Further, such selection of a new multimedia clip will preferably be made from a collection of media clips that have a theme that at least approximately matches that of the multimedia work.

Additionally, and according to another preferred embodiment, in some cases each multimedia clip will be limited in its length to a running time of about 20 seconds or less, assuming that the track length is on the order of a minute or more. In other words, it is anticipated that several clips will need to be read from the database in order to completely fill a track. As before, in a preferred embodiment with each move over another track or within the track, the instant invention selects another appropriate multimedia clip from among the available multimedia content that fits the required specific type of content of the current track. This process will preferably be continued until every track and every location within a track is filled.

In other embodiments, when the cursor is hovered over a track with an existing media clip, that clip will be replaced by one selected by the software. As was mentioned previously, it is preferred that the replacement media clips have a theme that at least approximately coincides with that of the multimedia work.

In still another preferred arrangement, the user will position the cursor over a track location and then click on the mouse button or press a key to indicate to the computer program that a clip of the appropriate type and theme is to be inserted at the location designated by the cursor. As before, the user merely designates the location of the clip and the software selects which specific clip is to be inserted.

In yet another preferred embodiment the user will be able to take advantage of an automated approach of populating the individual tracks. In this embodiment, which will preferably be limited in application to audio content only, the user will define the number of tracks, the type of the tracks, the desired run time, as well as a number of musical properties that are to be used to screen the clips that are inserted into the work. For example, tempo and pitch might be selected as screening criteria and the instant embodiment will automatically choose audio clips from a clip database that are within user specified limits. Other criteria that might be used include, without limitation, clips that have a predefined maximum and/or minimum tempo, pitch, or length. In some preferred embodiments, the user will be able to specify that the chosen clips should have at least approximately an average (or other calculated value of) tempo, pitch, length, etc. Additionally, some embodiments will allow the user to specify a musical style (e.g., jazz, rock, country, Christmas, blues, folk, etc.) and/or whether or not the clip contains vocals. The clips that meet the user established criteria will then be inserted into the selected track. In the instant embodiment if the user desires to change the output multimedia work it will be possible to regenerate the entire work, or regenerate individual tracks. In this embodiment, clip-level editing (as is described below) will not be permitted. Instead, the user will be given an option to completely regenerate any (or all) of the tracks until the track and/or the composite work is acceptable. Additionally the user will also be allowed to add additional empty tracks to the arrangement of the multimedia work in cases where the user desires a more diversified musical experience.

Those of ordinary skill in the art will recognize that the movement of the on-screen cursor can be controlled with a keyboard, a mouse or any other conventional or unconventional means of interaction with a computer. The precise method by which the cursor is moved about the screen is not important to the operation of the invention disclosed herein.

It should be noted that the instant method enables the user to create a complex multimedia composition in a matter of seconds, wherein the selection of the multimedia content matches the properties of the tracks in which it is deposited.

Furthermore, after the user has completed his or her creation, the invention will preferably provide a means for the user to edit it according to a method similar to that set out above. More specifically, if, after reviewing the work, the user is not satisfied with a specific arrangement of the multimedia clips, the instant invention allows for a quick replacement of one or all of the clips. In such a circumstance, the user preferably will move the cursor over the clip which is to be changed and then will click the mouse, press a key, hold the cursor motionless for a predetermined period of time, etc. (i.e., "clip-level editing"). Upon receipt of this signal, the program will automatically replace the selected clip (whether audio or video) with another clip of the same type according to the requirements of the track in which each multimedia clips is inserted.

The logic by which the multimedia clips are selected for insertion—both during the initial composition of the work as well as during subsequent editing—is preferably designed to be specifiable by the user. That is, it is preferred that the user be given some say in the decision rules (or selection criteria, etc.) that control the selection of clips for insertion. By way of example only, selection logic that might be offered to the user includes random insertion from a thematically related multimedia clip pool, insertion by date of the work, insertion by title, or according to several other possible requirements.

It should be clear that an invention such as that taught herein would be a tremendous aid to the novice user who wishes to create and edit a multimedia composition based on a collection of recorded video clips, music clips, digital photos, etc., but does not have the creativity, time or inclination to learn to utilize the various specific requirements of the multimedia content editing software that would otherwise be required to create and edit such a multimedia composition.

The foregoing has outlined in broad terms the more important features of the invention disclosed herein so that the detailed description that follows may be more clearly understood, and so that the contribution of the instant inventors to the art may be better appreciated. The instant invention is not to be limited in its application to the details of the construction and to the arrangements of the components set forth in the following description or illustrated in the drawings. Rather, the invention is capable of other embodiments and of being practiced and carried out in various other ways not specifically enumerated herein. Additionally, the disclosure that follows is intended to apply to all alternatives, modifications and equivalents as may be included within the spirit and scope of the invention as defined by the appended claims. Further, it should be understood that the phraseology and terminology employed herein are for the purpose of description and should not be regarded as limiting, unless the specification specifically so limits the invention. Further objects, features, and advantages of the present invention will be apparent upon examining the accompanying drawings and upon reading the following description of the preferred embodiments

BRIEF DESCRIPTION OF THE DRAWINGS

FIG. 8 illustrates a flowchart of another preferred embodiment of the instant invention.

DESCRIPTION OF THE PREFERRED
EMBODIMENTS

Background of the Invention

Figure 1:
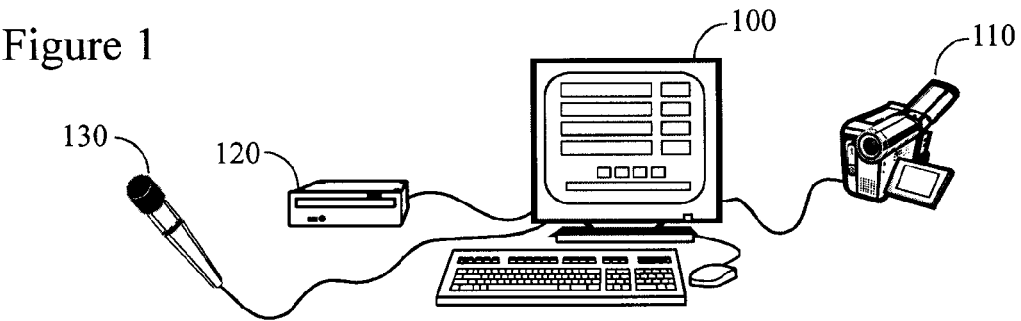
FIG. 1 depicts the general environment of the instant invention.

Referring now to the drawings, wherein like reference numerals indicate the same parts throughout the several views, there is provided herein a preferred system and method for assisting a user in creating a multimedia work. As is generally indicated in FIG. 1, at least a portion of the instant invention will be implemented in the form of software running on a user's computer 100. Such a computer 100 will have some amount of program memory and hard disk storage (whether internal or accessed via a network) as is conventionally supplied with such units.

Additionally, it is possible that a camera 110 of some sort will be utilized with and will preferably be connectable to the computer 100 so that video and/or graphic information can be transferred to and from the computer 100. Preferably the camera 110 will be a digital video camera, although that is not a requirement, as it is contemplated that, for example, the user might wish to utilize still images from a digital still camera in the creation of his or her multimedia work. Further, given the modern trend toward incorporation of cameras into other electronic components (e.g., in handheld computers, telephones, laptops, etc.) those of ordinary skill in the art will recognize that the camera 110 might be integrated into the computer or into some other electronic device and, thus, might not be a traditional single-purposes video or still camera. Although the camera 110 will preferably be digital in nature, any sort of camera might be used, provided that the proper interfacing hardware between it and the computer 100 is utilized. For example, if the camera 110 is a conventional film-based system, a scanner could be used to convert the printed photographs into digital form according to methods well known to those of ordinary skill in the art. Finally, in some applications a microphone 130, which is preferably attached to computer 100, might be provided for use by the creator of the multimedia work. Among other uses, the microphone would allow a user to add voiceover narration to the work if that were desired.

Preferred Embodiments

Figure 2:
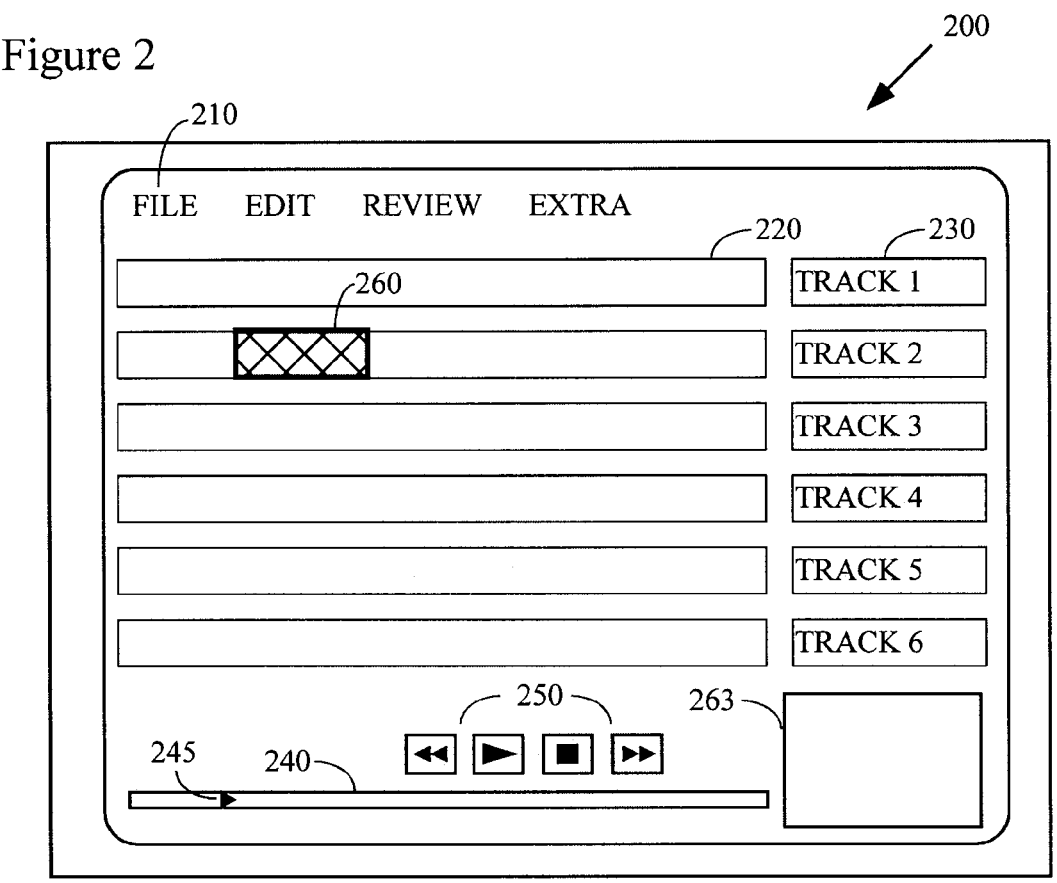
FIG. 2 illustrates a preferred screen layout for use with the instant invention.

Turning next to FIG. 2, according to a preferred embodiment a user of the instant multimedia editing system will be presented with a computer screen 200 which preferably contains components of the general sort indicated in this figure. For example, and as is typical in multimedia editing programs, menu items 210 will be provided to allow a user to read, save, and edit the multi media work. Additionally, the user will typically be initially provided with a plurality of empty tracks 220 which are designed to contain specific types of multimedia clips therein. Although in the preferred embodiment each of the tracks will be the same length, in some embodiments the tracks might have different lengths (e.g., the video track may be shorter than the audio track where there is to be an audio lead-in before the video starts and/or an audio that extends beyond the end of the video). Additionally, in some cases the audio tracks may be different lengths where, for example, it is desired to start with a single track and then add a second, third, etc., track to the mix to create a buildup in the audio portion of the multimedia work.

Associated with each track 220 is preferably a track descriptor 230 which contains a brief description of the allowed content of the associated track and which indicates to the user and the instant invention what sort of multimedia clip is to be placed therein. Transport controls 250 are preferably styled to resemble their counterparts on a conventional tape deck and provide a way for a user to control playback of the multimedia work through functions such as rewind, play, stop/record, fast forward, etc. Those of ordinary skill in the art will recognize that such controls are commonplace and well known in media editing programs. It is typical in multimedia editing programs to devote some portion of the screen to a view window 263, wherein the multimedia work may be displayed during the time that it is being built and edited. Time line 240 is used in conjunction with position indicator 245 to give the user a general indication of the location within the multimedia work of the content displayed within the view window 263 as indicated by the position of the cursor 260, etc.

Preferably the cursor 260 can be moved around the screen by the user to select different tracks 230, individual (or groups of) multimedia clips, etc. Note that in this particular example the cursor 260 was chosen to be rectangular (as opposed to the more familiar arrow-shape). Depending on the application and the desires of the particular application designer, the cursor 260 might change in size or shape depending on the type of multimedia content that is present in the underlying track 230, the duration or type of the selected multimedia clip, the duration or type of the open track location beneath the cursor, etc.

Figure 3:
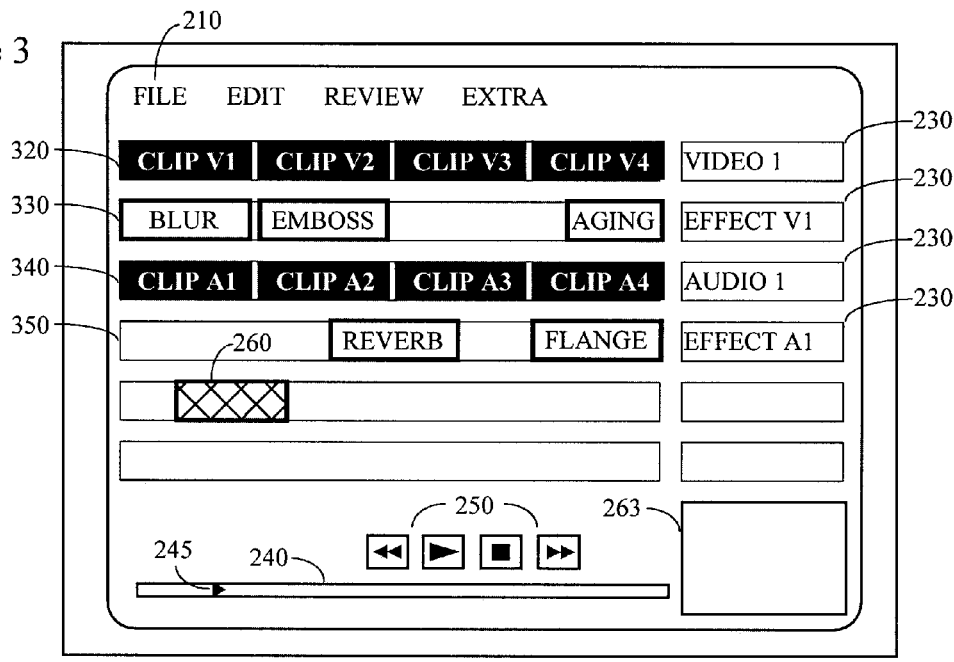
FIG. 3 illustrates how multimedia clips can be inserted into corresponding tracks according to the desires of the user.

Turning now to the example of FIG. 3, as can be seen four different tracks 320-350 are being utilized: a video track 320, a corresponding video effects track 330, an audio track 340, and a corresponding audio effects track 350. In this preferred arrangement, track 320 contains video clips which are designed to be played sequentially as is conventionally done. Associated with some of the clips in video track 320 are the various video effects that are located in track 330. The video effects track 330 does not need to contain "clips" but instead preferably contains instructions for applying various video processing effects to clips in the video track 320. That being said, for purposes of the instant disclosure, "clip" should be interpreted to include traditional multimedia clips as well as effects that are to be applied to same, furthermore a clip preferably has a length of less than 20 seconds. As is indicated in FIG. 3, preferably clip V1 in video track 320 will be processed via a "blur" filter either in real time during playback (if the computer has sufficient power) or as the entire work is rendered and written to output. Either way, in this embodiment a particular effect that appears in the video effect track 330 will be applied to the corresponding video clip in the video track 320. Note that the user may or may not pair a video clip together with an effect. For example, video clip V3 does not have any assigned effect. Similarly, video effects need not exactly correspond in time to a video clip and might extend beyond such a clip, span multiple clips, or be positioned between two clips depending on the nature of the effect. Similarly, the audio effects in track 350 are designed to be applied to the audio clips in audio track 340 according to the desires of the user.

Note that the clips illustrated in FIG. 3 do not all have to be of the same length, although that would be convenient in some instances. Indeed, it is certainly possible to apply a video effect (track 330) to only a portion of a video clip 320 and, if such were the case, the filter would preferably be drawn graphically to reflect that fact. Notice, for example, that the "aging" filter (e.g., application of a sepia tone and/or artificially generated video scratches) is applied to only the end of clip V4. Similarly, the audio "reverb" filter is applied to the end of audio clip A2 and the beginning of audio clip A3. Clearly, many other alternative arrangements are possible.

Figure 4:
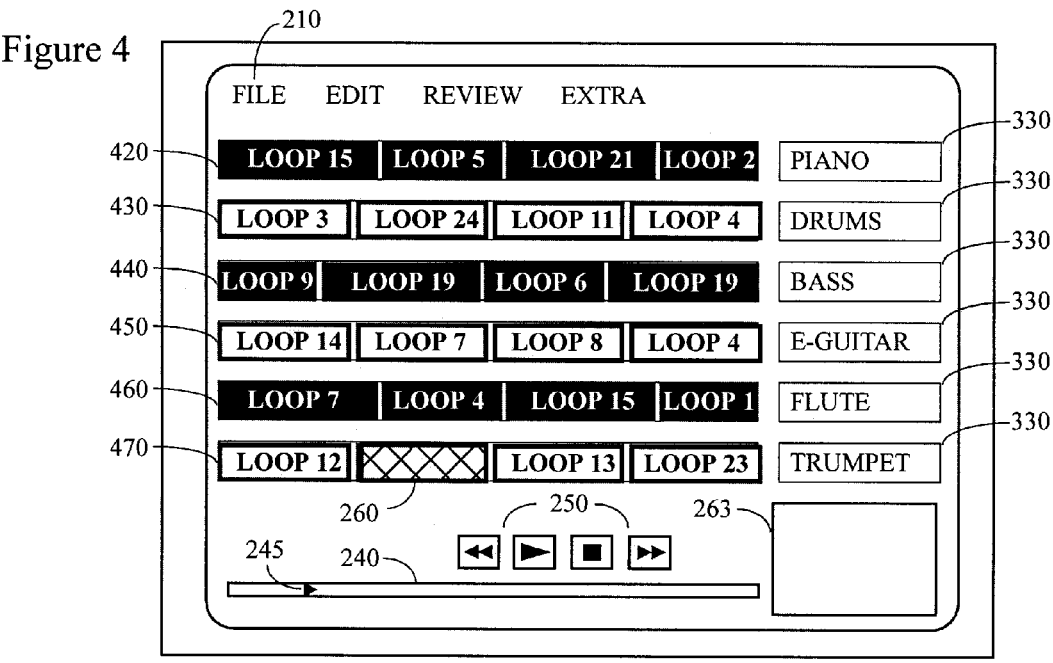
FIG. 4 provides an illustration of how each track can correspond to a different instrument.

In another preferred variation and as is illustrated in FIG. 4, each track 420-470 corresponds to a different musical instrument rather than to a different type of media. As is indicated by the track names 330, in this embodiment each track contains audio clips of the same sort as is called for in the corresponding track name 330. For example, track 420 contains audio loops of a piano playing, whereas track 470 contains loops of digitally sampled trumpets. As has been explained previously, it is not necessary that the loops that are used all be exactly the same length, although that might be desirable in some applications.

Preparation of the Media Clips

It is necessary to the operation of the instant invention that the user be provided with multiple video, audio, etc. clips that can be used as building blocks in the assembly of the user's multimedia work. Further, in order to make the user experience—and the resulting multimedia work—as pleasant as possible, each of the multimedia works should be categorized such that it is possible to draw compatible clips from among them, e.g., clips with a common theme, motif, instrument type, musical key, time signature, tempo, etc., should be identifiable so that when a clip is to be inserted in a track the selected clip will match the type-content of the selected track and further will sound and appear euphonious in combination with clips already present and those to be added thereafter.

Organizing the media clips for selection during composition might be done in many ways, but one preferred method is as follows. After the user has specified the components of his or her composition (e.g., by specifying the track descriptors 230), the instant invention will preferably identify a set of media clips (discussed more fully below) that are compatible with the various track descriptors of the composition. The collection of such clips will preferably comprise at least the core part of the set from which clips will be drawn during the data entry phase.

As a specific example of the way that compatible clips might be assembled, consider the case of a user who seeks to build a multimedia video work that has as its theme a forest during a rain storm. For purposes of illustration only, it will be assumed that a track layout similar to that in FIG. 3 has been selected and that the descriptors listed there have been adopted/specified by the user. In such a case, the clips suitable for input into the video track might include a collection of video clips that include long shots of rain coming down on the mountains, shorter shots of rain falling on a strand or trees or on the surface of a lake, and close up shots of water dripping on various plants and animals. Additionally, it is anticipated that—even in the event that there is random selection of clips—in some instances it might be preferable to further refine the classification of these video clips into categories such as "video-start", "video-middle", "video-end", etc. (i.e., some or all of the clips could be assigned a "positional" preference or category), so that certain of the video clips would be marked as suitable for insertion at the start, middle, or end of the work, respectively. The same sort of classification could be applied to audio clips as well and clearly, incorporation of such logic into the clip selection process could readily be made based on the user-selected time position of the cursor within the designated track. Those of ordinary skill in the art will recognize that many variations and alternatives of this arrangement are possible within the scope of the instant invention.

Continuing with the previous example, it would be expected that the user would be similarly provided with a number of audio tracks that are suitable for use with a forest-themed video. Note that there may be multiple audio tracks, each of which might have its own associated effects track. Further, it is anticipated that in some cases a selected video clip might have associated with it a specific audio (sound) track which, depending on the desires of the user or designer, might be automatically inserted into an available audio track location. The inclusion of this linked track within the multimedia work might or might not be made to be overridden by the user. The audio track descriptors might include different screening criteria for each track, for example, "rain sounds", "background music", "animal sounds", etc., if there were three different audio tracks. It would be expected that there would be an assortment of audio clips of each of these types made accessible to the user. Thus, if the user indicated that input was to be placed into the "animal sounds" track, the program would select from among the clips in the associated database that have been identified to be "animal sounds" (e.g., digital recordings of cricket chips, frog croaks, dogs barking, etc.) and insert the selected clips into the work.

In the case where a user desires to create an audio-only work or where the user desires to add a single- or multi-track audio accompaniment to a video work (e.g., as generally illustrated in FIG. 4), it is preferable that the audio clips from which the work is constructed be assigned to track types based on musically relevant criteria such as instrument type (or principal instrument type of the clip is not a solo performance), musical key, musical style, tempo, etc. That being said, those of ordinary skill in the art will recognize that it is possible to automatically transform audio clips to any desired pitch, tempo, etc., as this is routinely done. As a consequence, the clips stored in tracks 420-470 are preferably either of a compatible tempo and key or transformable into a predetermined tempo and key.

Preferred Database Structure

According to a preferred arrangement the collection of multimedia clips that are to be used in a user composition will be organized within a database-type structure as follows. First, with respect to the multimedia clips themselves, it is preferred that the clips, whether audio, video, or both, be relatively short, e.g., less than 20 seconds. Further, it is preferred that at least a subset of the clips be compatible in some sense. For example, if the clips include musical samples, at least a portion of those samples will preferably be in a common key, have a common time signature, and be of the same style (e.g., rock, salsa, Latin, jazz, etc.). Of course, those of ordinary skill in the art will recognize that it is possible in many cases to automatically mathematically transform audio clips to alternative key signatures, tempos, etc., and, as a consequence, it is not a strict requirement that the audio clips be compatible in their original forms but only that they be sonically compatible after such transformation.

Next with respect to the clip organization, it is anticipated that the clips from which the multimedia work is to be built will be organized and kept together as part of a database, where the term "database" is used in the broadest sense to include any sort of arrangement wherein the clips may be selected according to their type. Those of ordinary skill in the art will recognize that these modest requirements might be satisfied by, for example, placing each clip into a separate computer file that has a name that reflects its contents, e.g., "audio_piano__64BPM_rock_BFLAT.mpg" would be used to label a rock-type piano (audio) work that has a tempo of 64 BPM and is in the key of B-flat. Of course, a hierarchical file arrangement (e.g., directories and subdirectories) or a conventional database might also be used. In any case, it is only necessary that the controlling computer program be able to differentiate between the various clips and be able to select individual ones of them according to the designated criteria.

Figure 6:
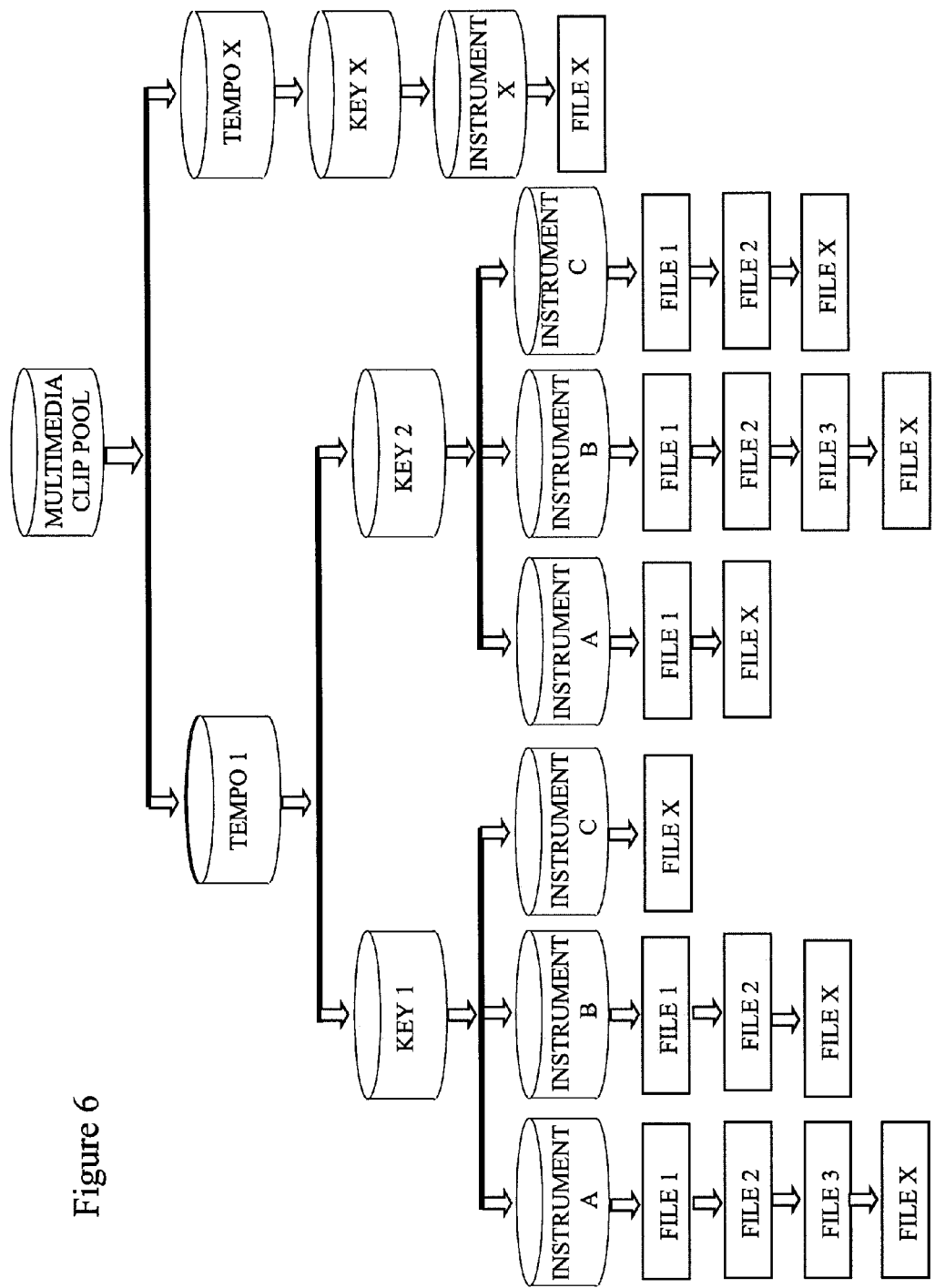
FIG. 6 contains a schematic illustration of how a multimedia clip pool suitable for use with the instant invention might be organized.

As an example of a preferred organization that would be suitable for use with the instant invention, consider first the arrangement of FIG. 6. The arrangement that is illustrated in this figure would be especially appropriate for composing an audio work, or the audio portion of a video work. As can be seen, the files in the database (i.e., the "Multimedia Clip Pool") are organized by tempo, with there being a plurality of different tempos provided (i.e., "TEMPO X" generally indicates an "Xth" available tempo). The clips are further organized within each tempo by key signature, with this example illustrating two different key selections (e.g., the keys of C and G). In this example, there are three instruments (Instruments A-C) playing in Key 1. Clearly, there could be more (or fewer) instruments provided.

Associated with each instrument/key/tempo combination are one or more variations which are denoted as Files 1-X in the figure. Of course, these clips need not be stored in different computer files but instead might all be records in a single database, etc. Either way, these variations could include digital recordings of, for example, a flute playing different melody lines in the designated key/tempo. Similarly, Key 2 has associated with it three instruments and variations of their performances. Note that FIG. 6 is not intended to indicate that there must be the same number of instruments playing in each key nor that the instruments even be the same. The generic description "Instrument A" has been used to indicate that any sort of instrument (or, for that matter, any combination of instruments) might be used and "Instrument A" need not represent the same instrument each time that text appears in this figure. Finally, it should be clear to those of ordinary skill in the art that the types of subdivisions of the music clips discussed above are only offered by way of example and either more or fewer categorizations might be used.

Figure 7:
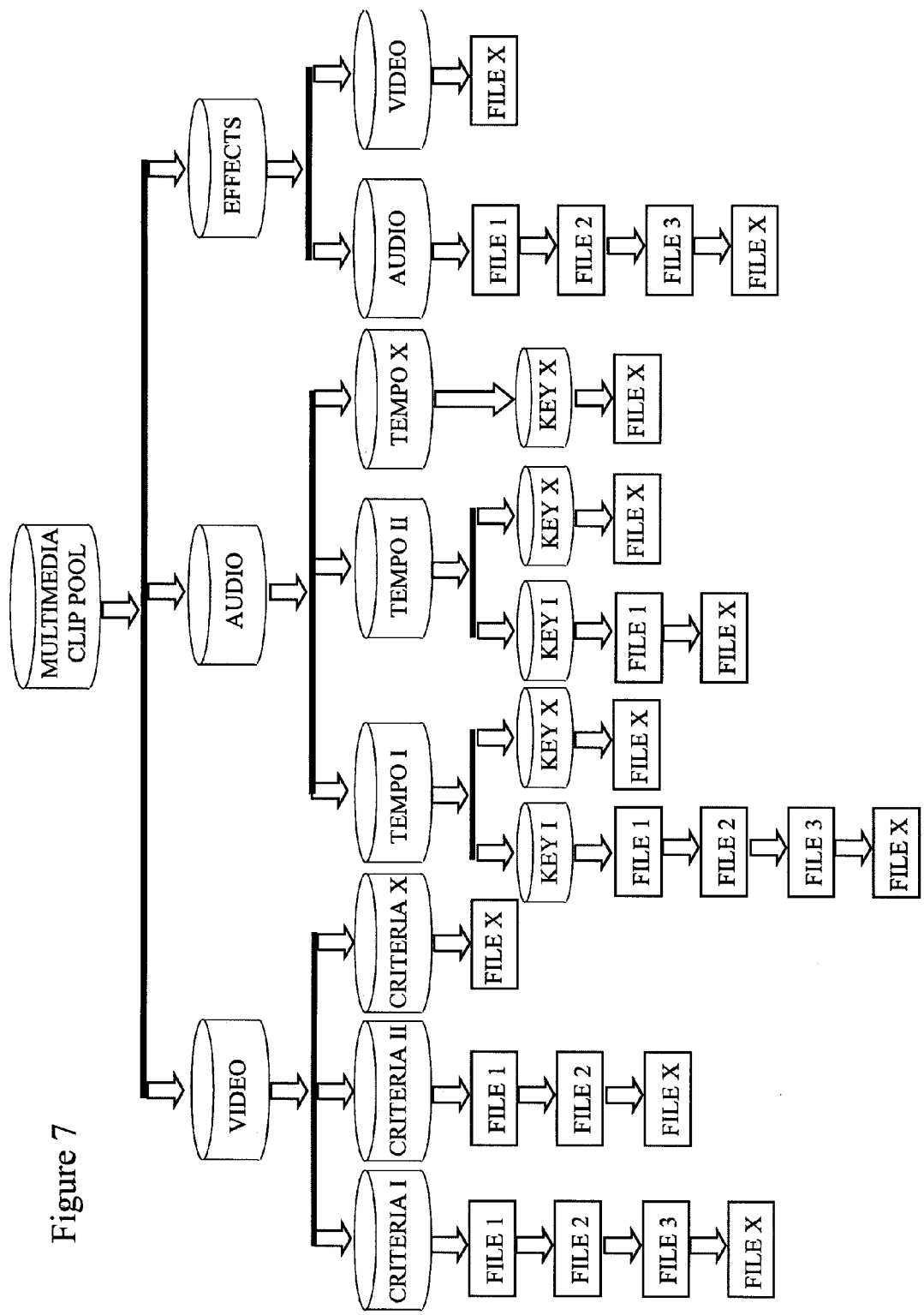
FIG. 7 illustrates a preferred organization for another multimedia clip pool.

Turning next to FIG. 7, this figure illustrates a preferred organization that would be appropriate for creating video multimedia works. In this case, the various clips are organized first by type (e.g., video, audio, effects, etc.), with the further organization preferably depending on the particular type of clip. For example, in the case of video clips, these clips might be grouped according to criteria such as general subject matter (e.g., children, street scenes, geometric patterns, etc.), static shots vs. motion shots, long shots vs. close-ups, etc. The number of ways in which these clips can be organized is limited only by the imagination of the program designer and/or the end user.

In the case of the audio clips in FIG. 7, as has been discussed previously, such clips are preferably organized by tempo, instrument, key, etc., or any other organization that allows compatible clips to be automatically selected. Finally, FIG. 7 contains a suggested way to organize video effects. As a preliminary division, the effects have been grouped into audio and video effects. The provided audio effects might include such standard operations as adding reverb, band pass filtering, limiting, flanging, etc. Video effects might include sharpening, color balancing, etc., and transition effects such as wipes, fades, irises, etc. Note that the effects need not be stored in discrete files, although it might be convenient to store values of the controlling parameters in such a file.

If a user wishes to insert new multimedia clips into the clip pool, this can be done either automatically or manually. The automatic addition of new clips to the database would likely best be suited where the music clips can be scanned to determine their key signature, tempo, or other relevant characteristics. Upon determination of quantities such as this, the clip could then be incorporated into and made a part of the appropriate branch of the database of FIGS. 5 and 6.

Additionally, it is contemplated that a user might wish to manually set the parameter values that are used to categorize the video or audio clips. Since it is likely that automatic identification and typing of the video clips might prove to be difficult in general, it is expected (but not required) that each video clip will be manually assigned by the user to a category or categories at the time it is incorporated into the database.

After each clip has been categorized—either automatically or manually—the clips will be inserted into the multimedia content pool according to their specific characteristics. Finally, those of ordinary skill in the art will recognize that there may never be an actual "insertion" of a media clip into the database but, instead, a pointer or link might be established within the database which indicates the location of the file.

Operation of the Preferred Embodiments

In practice the instant multimedia editing invention will preferably operate as follows. As is set out in FIG. 5, the invention 500 preferably begins by preparing multimedia clips for use in the editing process (step 505). This step 505 has been discussed in some detail previously. Note that step 505 may be dependent on the form and composition of the multimedia work that is selected by the user. That is, the type of clips that will be used during the building of the multimedia work will be largely dependent on the type of that work (e.g., audio, video, or both) as well as its theme or motif.

Given a selection of media clips, the user will typically next specify whether the work that is to be created is new or a modification of a preexisting work (step 510). In the event that the user wishes to modify a preexisting work, that work preferably will be read into memory 515 where it can be accessed and modified. Of course, in-place disk-based editing is also a possibility.

As a next preferred step, various program variables will be initialized and the user interface will be prepared and drawn (step 520) on the computer screen. If the user is creating a new work, he or she might be presented with an empty interface screen similar to that presented in FIG. 2 and given the option of specifying the track types/contents. On the other hand, if the user has elected to modify a preexisting work, the initial input screen might be more similar in appearance to the examples of FIGS. 3 and 4.

As a next preferred step 525 a decision will be made as to the input mode, the overwrite rules that will be utilized during this session, and the sort of tracks that will be provided for input. Note that these decisions might be left up to the user or predetermined by the program designer.

With respect to the input mode there are two preferred choices: "random" and "sequential". When the user selects "random" input, each successive media clip that is inserted will be randomly selected (either with or without replacement) from the pool of available media clips. On the other hand, if the user selects "sequential" input, each inserted media item will be chosen in a deterministic sequence order, wherein the order might be based on file name, file size, file creation date, or any other type of ordering that would be useful to the user.

With respect to the choice of track types, the user may be allowed to select some or all of the track descriptors (e.g., in the instance where a new work is to be created), or the designer may dictate this choice. Additionally, it is possible that the computer program itself might make this choice for the user (e.g., random selection of track types). But, however it is done, the track descriptors (230 and 330) will preferably be specified before the main input loop (steps 535 through 565) is entered. Note that FIGS. 3 and 4 contain two possible track assignment choices. The track arrangement of FIG. 3 would be appropriate if the user intended to create a multimedia video work, whereas the arrangement of FIG. 4 would be more suitable to the creation of an audio work.

By way of example, when the user positions the cursor above one of the effects tracks, an effect will be inserted at the time specified by the cursor and according to the input mode (step 525) discussed previously. Of course, those of ordinary skill in the art will recognize that it is not necessary for there to be actual computer files containing effects "clips". Instead, the computer will preferably be programmed to insert a graphic placeholder at the user-designated location to indicate that an effect will be applied to the associated track. The time duration of the effect might initially be chosen to be the length of a corresponding clip (whether audio or video) in the associated track, but it is certainly possible to allow the user to adjust the effect duration to suit his or her own tastes and needs. In some cases, the program might apply an effect to two adjacent clips (e.g., a "cross fade" effect might be applied to create a transition between two video clips that play successively). Clearly, the user could be allowed to control the parameters and placement of this or any other effect.

As a next preferred step, communications are established with the multimedia content pool (step 530). This could take the form of an "open" statement within the program or any other means of accessing stored digital content. Note that the clips might be resident on local disk, situated remotely and accessed via a network, or both.

Figure 5:
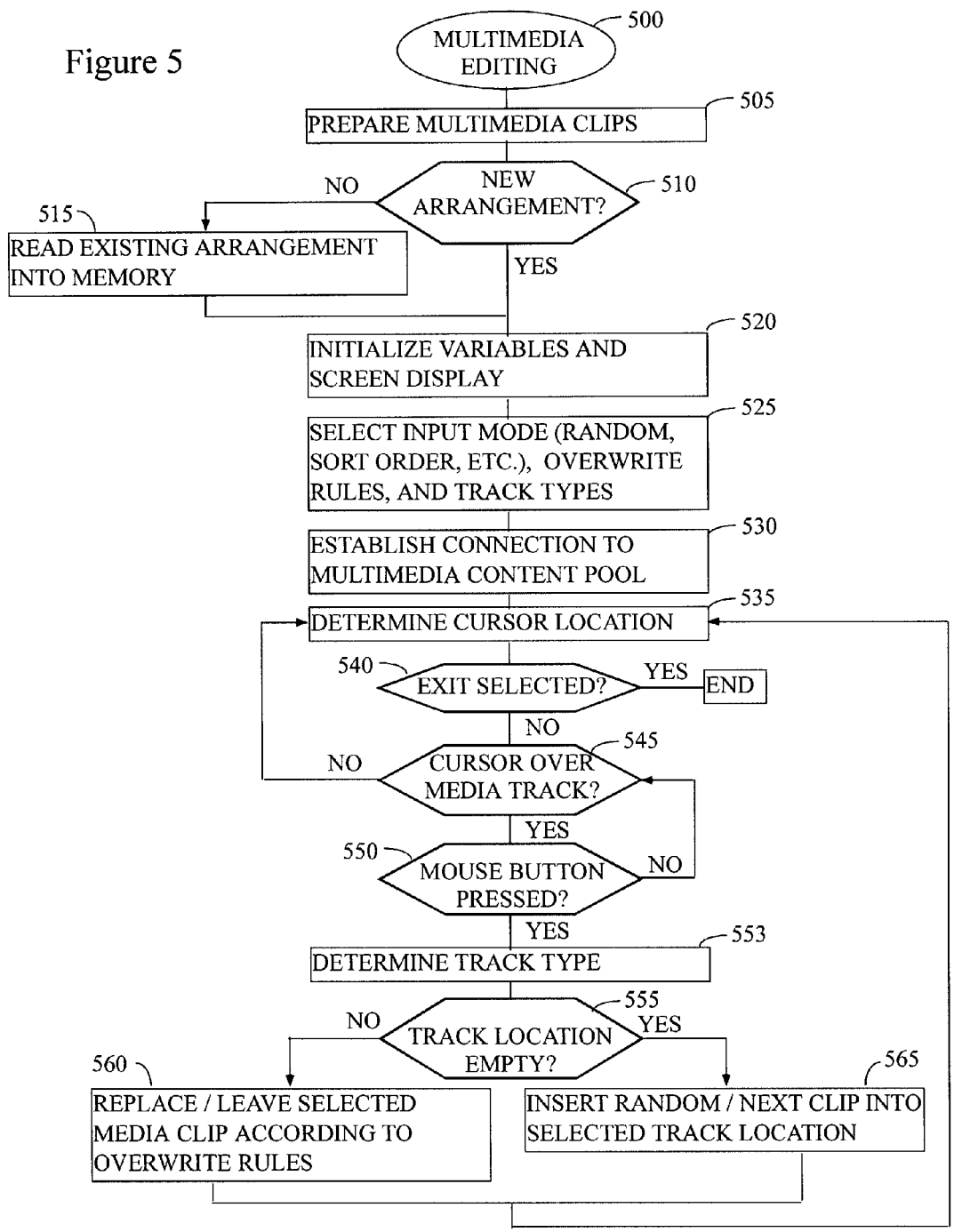
FIG. 5 contains a flowchart of a preferred embodiment of the instant invention.

Steps 535 through 565 of FIG. 5 represent the main user interaction loop. First, preferably the program will locate the position of the cursor or pointer within the edit window (step 535). If the user has indicated that he or she wishes to exit (step 540) the program will cease operation, preferably after saving the work to hard disk or other computer readable media. Otherwise, the preferred program continues by determining whether or not the cursor is positioned over one of the media tracks (step 545). Assuming that it is so positioned, the instant program then watches for a mouse button press or similar indicia from the user (step 550) that a clip should be inserted, which indicia could also include holding the cursor stationary for an arbitrarily brief period of time above a track location, pressing a single key or a key combination, etc. In some preferred embodiments, merely moving the cursor above an empty clip location will automatically result in the immediate insertion of a clip.

During the insertion process, upon receipt of a mouse click or other indicia, the instant program preferably continues by determining the selected media track content type (step 553). It should be noted that the track content might be narrowly or broadly defined according to the desires of the user and/or program designer. For example, the track content for a video track might be defined as expansively as "video clips" or more narrowly as "video clips related to night time rain storms." Similarly, in the case of audio works, the track content might be broadly defined (e.g., a musical genre such as swing, Latin, rock, etc.) or more narrowly defined to be clips related to a particular instrument playing in a particular key at a particular tempo. Clearly, the subject matter and breadth of a track definition is limited only by the imagination of the user/designer and the availability of multimedia clips for inclusion therein.

The instant program preferably next branches depending on whether or not the track/time location indicated by the user's cursor overlaps in whole or in part a multimedia clip that is already in place in that track (step 555). Considering first the case where the track location is empty, the preferred method continues by inserting a multimedia clip at the user's selected time and track location according to the user's selected input mode and track content type. By way of example only, if the user's chosen input mode is "random", the program will randomly select from among the suitable multimedia clips and insert the selected clip. As another example, if the input mode is "sequential", the program will select the next multimedia clip in sequence and insert it at the time/track number requested. Clearly, those of ordinary skill in the art will be able to devise many other variations within the spirit of the instant invention.

Considering next the circumstance where the user has positioned the on-screen cursor over an existing media clip (step 560), several scenarios are possible depending on the user's choice of overwrite rules (step 525). In a first preferred scenario, the controlling program will refuse to replace the existing clip into the composition. This mode of operation could prove to be quite useful where the user is generally satisfied with a composition but desires to add just a few more clips within empty track locations. In this case, if the user accidentally designates a track for input that contains a clip, the requested insertion will not be made, thereby preserving the integrity of the original work. In one preferred arrangement, this option may be toggled on and off by the user.

In another preferred scenario, a new clip will replace the existing clip which has been selected by the user. Note that, in the case where the length of the replacement clip is different from that of the original, the instant method will preferably shift the clips in all of the tracks to accommodate the new clip, although other responses are also possible (e.g., shortening or lengthening the inserted clip). As an additional example, the two clips could be digitally added together (e.g., merged), subtracted, or any other mathematical operation that can be performed on the two subject clips to produce a single clip as output. Additionally, it is preferred that when one clip replaces another that the clip which is selected for replacement (whether selected randomly, sequentially, positionally, etc.) be similar in some sense to the clip it replaces. For example, the replacement clip might be playing in a similar key, at a similar rhythm, in a similar style, etc. Thus, the process of selecting a replacement clip would preferably involve either a pre-screening to produce a subpopulation of clips that consist only of compatible choices, or, in the alternative, clips could be selected as usual with post-selection screening eliminating incompatible clips.

The task of replacing an existing multimedia clip with a different—but compatible—multimedia clip is preferably accomplished through the use of the multimedia content pool described previously in connection with FIGS. 6 and 7. By implementing the preferred database structure wherein clips are organized into a hierarchical structure according to the specific characteristics of the multimedia clip, replacement clips can be readily selected from the same subset of the database (e.g., clips with the same instrument, tempo, and key) from which the selected-to-be-replaced clip was originally drawn.

Of course, the requirement that the original and replacement clips be compatible with one another will preferably be an option that the user can disable if desired. In some circumstances, a user may seek dissonance instead of harmony Finally, the instant method preferably continues by returning to the cursor location step (step 535) and further preferably continues to insert new clips so long as the user desires it.

Turning next to FIG. 8, this figure illustrates still another preferred embodiment of the instant invention as it will operate when creating audio multimedia works. As is indicated in FIG. 8, this embodiment of the invention 800 preferably begins by preparing multimedia clips for use in the editing process (step 805). Note that in this embodiment, the lengths of each of these clips will be about 20 seconds or less in length. This arrangement would be appropriate for use where the multimedia work has a length of a few minutes or longer so that several different clips (at least two) are used in each track. The steps that will preferably be used to prepare each clip will preferably be more or less the same as have been discussed previously in connection with other embodiments. Note that step 805 may be dependent on the form and composition of the multimedia work that has been selected by the user. That is, the type of clips that will be used during the building of the multimedia work will be largely dependent on the type of that work (e.g., audio, video, or both) as well as its theme or motif.

Given a selection of media clips, the user will typically next specify whether the work that is to be created is new or is to be a modification of a preexisting work (step 810). In the event that the user wishes to modify a preexisting work, that work preferably will be read into memory 815 where it can be accessed and modified. Of course, in-place disk-based editing is also a possibility.

As a next preferred step, various program variables will be initialized and the user interface will be prepared and drawn (step 818) on the computer screen. If the user is creating a new work, he or she might be presented with an empty interface screen similar to that presented in FIG. 2 and given the option of specifying the track types/contents. On the other hand, if the user has elected to modify a preexisting work, the initial input screen might be more similar in appearance to the examples of FIGS. 3 and 4.

In a next preferred step, in case that a new arrangement has been selected, the user will preferably be able to define global selection rules 820 that will be used to shape the criteria by which the clips in step 655 will be selected for insertion. Among the sorts of parameters that might be selected are the number of tracks 825, the length of the tracks 830, the type/descriptors of the tracks 835, the musical properties 840 of the audio work taken as a whole or the properties of individual tracks, etc. If the user has selected an existing arrangement, the instant invention will open it and the user will preferably be able to edit the existing insertion rules 820 and/or select new rules. That is, the user will preferably be able to change the number of tracks 825, the length of the tracks 830, the type of individual tracks 835 the musical properties 840 of the individual tracks or the audio work, etc.

As a next preferred step the instant invention will establish communications with the multimedia content pool (step 845). This could take the form of an "open" command within the program or any other means of accessing stored digital content. Note that the clips might be resident on local disk or other nonvolatile storage, situated remotely and accessed via a network, or both.

Steps 850 through 860 of FIG. 8 are the key steps in the process of creating the audio work. First, preferably the program will determine the type/descriptor of each track 850 in the arrangement. It should be noted that the track type might be narrowly or broadly defined according to the desires of the user. For example, the track type might be broadly defined (e.g., a musical genre such as swing, Latin, rock, etc.) or more narrowly defined to be clips related to a particular instrument playing in a particular key at a particular tempo. Clearly, the subject matter and breadth of a track descriptor definition is limited only by the imagination of the user/designer and the availability of audio clips for inclusion therein.

Next, one or more clips will be read from the multimedia content pool (step 852). Preferably the clips that are read at this step will only be those that satisfy the criteria establish in step 820. That being said, in some cases the screening step might occur after the clip is read (e.g., after a parameter value is calculated from the clip). That being said, and as has been indicated previously in connection with other embodiments, preferably the relevant parameters of each clip will be stored along with it in the database, thereby making selection of clips according to the rule set relatively straightforward.

The instant invention will preferably next automatically insert clips into the selected tracks according to the insertion rules defined in step 855. This step will preferably be carried out until all the tracks are filled with audio content and the audio work is completed. As was indicated previously, each track will preferably have its own insertion rules associated therewith. The output audio work might, for example, be specified to have 4 tracks, with one track being 90 seconds long. It might be limited to containing only audio clips that have recordings of piano audio material. It might also be restricted to containing only audio material that has a particular tempo. Note that this limitation might require that the clip have a "natural" (unmodified) tempo that matches the user's criterion or that the clip be one that can be tempo-adjusted to the required value. As still another example, a different track might be 180 seconds long, accept only audio clips containing horn audio material with a particular tempo and pitch, etc. Additionally, in some cases the clips might be identified with a positional preference (e.g., a clip might be more suited for the start, end, or middle of a track) and that preference will be used to further constrain the placement of clips if the user so desires.

The instant invention will preferably fill each track one after another until all tracks have been populated with clips according to the rules provided (steps 850 through 870). After all tracks have been filled with audio content, the user will preferably be able to play the audio work and decide if it is acceptable. Additionally it will preferably be possible for the user to be able to audition individual tracks and request an instant "re-fill" of the track if it is not satisfactory. That is, upon request of the user the existing audio material contained in the designated track will be deleted and replaced by a new collection of clips. It will preferably be possible to initiate the "re-fill track" option an unlimited number of times, until the user is satisfied with the result. In the preferred arrangement, whole track replacement will be the only editing option offered to the user when working with an existing arrangement.

CONCLUSIONS

Thus, and by way of summary, the instant program operates to allow a user to quickly and easily build and edit a multimedia work by simply positioning a cursor above an on-screen track and automatically inserting a specific multimedia clip according to the requirements of the on-screen track. In a preferred arrangement, the user will be offered a series of on-screen input tracks as is conventionally done. Each of these tracks will be assigned to a specific content type, for example, one track might be designated to contain clips from a specific musical instrument (e.g., a saxophone), another track might contain clips of an orchestra, another track might contain video clips, etc. In one preferred embodiment, the user will cause entry of new multimedia content into the different tracks by positioning the cursor over an empty space in a track and then clicking the mouse button. In another arrangement, if the user positions the cursor above an empty track location—without more—a new clip will automatically be inserted. This process will allow the user to create a complex multimedia composition in a very short amount of time The controlling software will be designed to recognize the allowed content type of the track and automatically insert an appropriate musical or video clip into that track upon receipt of an appropriate indication from the user that a new clip is to be inserted.

The same process described above can be used to edit existing multimedia compositions and such editing will be much faster than the conventional editing processes. According to a preferred embodiment, the user will position the cursor over a specific multimedia clip which is to be replaced and initiates replacement by "clicking" the mouse or giving some other indication (e.g., a key press) that the clip has been selected. The associated software will recognize the specific characteristics of the selected multimedia clip and the track that contains it, and, given these characteristics, a connection to the multimedia content pool will be established. From the plurality of available multimedia clips in the content pool with the same characteristics as the selected clip, the instant invention will automatically insert an appropriate musical or video clip into that track in place of the selected multimedia clip, thereby implementing "one click editing".

Finally, it should be noted that those of ordinary skill in the art will be able to device any number of ways to select multimedia clips for input such that the resulting work is harmonious and/or results in a pleasant viewing or listening experience. For example, if the allowed content type of a track is, say, that of a solo violin, and the violin clips that are currently in place contain recordings of that instrument playing a melody in the key of C, the next click above an empty space in this track would preferably introduce a multimedia sound clip which is also a solo violin playing in the key of C, or in some compatible key, e.g., the key of G or the key of F. Additionally, it is anticipated that if the instrument recording within the inserted clip is not already playing at the appropriate tempo (or not already playing in the correct key), that it will be algorithmically converted to a matching tempo and key signature (e.g., beat matched and pitch shifted) according to methods well known to those of ordinary skill in the art. Finally, in selecting and inserting sound clips into selected tracks, it is anticipated that before a multimedia clip is inserted some comparison would be made between it and neighboring clips in other tracks to help insure that the resulting multimedia work will be in some sense harmonious.

Thus, the present invention is well adapted to carry out the objects and attain the ends and advantages mentioned above as well as those inherent therein. While the inventive device has been described and illustrated herein by reference to certain preferred embodiments in relation to the drawings attached hereto, various changes and further modifications, apart from those shown or suggested herein, may be made therein by those skilled in the art, without departing from the spirit of the inventive concept, the scope of which is to be determined by the following claims.

What is claimed is:

1. A method of creating a multimedia work, wherein is provided a computer screen displaying a plurality of tracks thereon, comprising the steps of:
   (a) receiving from a user a selection of one of said plurality of tracks displayed on said computer screen;
   (b) receiving from the user a selection of a plurality of screening criteria for said selected track, each of said plurality of screening criteria pertaining to a performance characteristic of an audio clip or a video clip;
   (c) performing steps (a) and (b) for at least two different tracks, thereby obtaining a plurality of track screening criteria corresponding to each of said at least two tracks;
   (d) automatically selecting one of said at least two tracks;
   (e) accessing a database containing a plurality of clips therein, wherein each of said plurality of clips is about 20 seconds or less in length;
   (f) automatically selecting a plurality of clips from said database according to said track screening criteria associated with said selected track;
   (g) hovering an on-screen pointer above said selected track;
   (h) while said on-screen pointer is hovered above said selected track, automatically inserting said selected plurality of clips into said selected track without further user intervention;
   (i) performing steps (d) through (h) until each of said at least two different tracks has been filled, thereby creating said multimedia work; and,
   (j) simultaneously performing said at least two tracks for at least one user, thereby performing said multimedia work.

2. The method according to claim 1, wherein said plurality of track screening criteria are selected from the group consisting of a maximum tempo, a minimum tempo, an average tempo, a maximum pitch, a minimum pitch, a minimum length, a maximum length, a musical key, a time signature, and, a musical style, and a positional preference.

3. The method according to claim 1, comprising the further step of:
   (k) storing said multimedia work on a computer readable medium.

4. The method according to claim 3, wherein said computer readable medium is selected from the group consisting of computer RAM, nonvolatile RAM, computer ROM, a PROM chip, flash RAM, a ROM card, a RAM card, a floppy disk, a magnetic disk, a magnetic tape, a magneto-optical disk, an optical disk, a CD-ROM disk, or a DVD disk.

5. The method according to claim 1, wherein one of said track screening criteria is a tempo, wherein there is at least one remaining non-tempo track screening criteria, and wherein step (f) comprises the steps of:
   (f1) automatically choosing a first clip from said database, said chosen clip having a chosen clip tempo,
   (f2) if said chosen clip tempo is different from said tempo, algorithmically adjusting said chosen clip to have a new tempo equal to said tempo, thereby creating an adjusted clip,
   (f3) if said chosen clip satisfies said at least one remaining non-tempo track screen criteria, selecting said adjusted clip,
   (f4) if said chosen clip fails to satisfy at least one of said at least one remaining non-tempo track screen criteria, not selecting said chosen clip, and,
   (f5) performing steps (f1) through (f4) until a plurality of selected clips have been obtained.

6. The method according to claim 1, wherein said database containing said plurality of clips is organized hierarchically by at least a clip tempo and a clip type.

7. The method according to claim 1, wherein each of said plurality of tracks has a different track length.

8. The method according to claim 1, wherein each of said plurality of tracks has a different plurality of screening criteria.

9. A method of creating a multimedia work, comprising the steps of:
   (a) displaying on a computer screen a plurality of empty tracks, each of said empty tracks having a length of at least 60 seconds or more,
   (b) receiving from a user a selection of one of said plurality of displayed empty tracks;

(c) receiving from the user a plurality of screening criteria for said selected track, each of said plurality of screening criteria pertaining to a performance characteristic of an audio clip or a video clip;

(d) performing steps (b) and (c) for at least two different selected tracks, thereby obtaining a plurality of track screening criteria corresponding to each of said at least two selected tracks;

(e) automatically choosing one of said at least two selected tracks;

(f) accessing a database containing a plurality of clips therein;

(g) automatically selecting a plurality of clips from said database according to said track screening criteria associated with said chosen track, wherein each of said plurality of selected clips is about 20 seconds or less in length, and wherein a total length of all of said plurality of clips taken together is at least as long as a length of said selected track;

(h) hovering an on-screen pointer above said selected track;

(i) while said on-screen pointer is hovered above said selected track, automatically inserting said selected plurality of clips into said selected track without further user intervention;

(j) performing steps (e) through (i) until each of said at least two tracks has been filled, thereby creating said multimedia work; and, (k) simultaneously performing said at least two tracks, thereby performing said multimedia work.

10. The method according to claim 9, further comprising:

(l) storing said multimedia work on a computer readable medium.

11. The method according to claim 10, wherein said computer readable medium is selected from the group consisting of computer RAM, nonvolatile RAM, computer ROM, a PROM chip, flash RAM, a ROM card, a RAM card, a floppy disk, a magnetic disk, a magnetic tape, a magneto-optical disk, an optical disk, a CD-ROM disk, or a DVD disk.

12. The method according to claim 9, wherein step (k) comprises the steps of:

(k1) receiving from the user a choice from among said at least two tracks, (k2) accessing said database, (k3) automatically selecting a plurality of clips from said database according to said track screening criteria associated with said chosen track, wherein each of said selected plurality of clips is about 20 seconds or less in length, (k4) automatically inserting said selected plurality of clips into said selected track without further user intervention thereby creating a modified track, and, (k5) simultaneously performing said modified track and any unmodified tracks, thereby performing said multimedia work.

13. The method according to claim 9, wherein step (a) comprises the steps of:

(a1) receiving from a user a number of tracks to display, said number of tracks to display being at least a plurality of tracks, and, (a2) displaying on a computer screen said plurality of empty tracks, each of said empty tracks having a length of at least 60 seconds or more.

14. The method according to claim 9, wherein one of said track screening criteria is a positional preference criterion, and wherein among said plurality of track screening criteria there is at least one other non-positional preference track screening criterion, and wherein step (g) comprises the steps of:

(g1) selecting one of said plurality of clips, (g2) determining whether said selected one of said plurality of clips has a positional preference associated therewith, (g3) if said selected one of said plurality of clips has a positional preference associated therewith, automatically inserting without further user intervention said selected one of said plurality of clips proximate to a track start, a track middle, or a track end depending on said clip positional preference, (g4) if said selected one of said plurality of clips has a non-positional preference associated therewith, automatically inserting said selected plurality of clips into said selected track without further user intervention, and, (g5) performing steps (g1) through (g4) until said selected track is filled.

* * * * *